United States Patent
Mailfert et al.

(10) Patent No.: US 8,979,508 B2
(45) Date of Patent: Mar. 17, 2015

(54) TURBOCHARGER AND VARIABLE-NOZZLE CARTRIDGE THEREFOR

(71) Applicant: Honeywell International Inc., Morristown, NJ (US)

(72) Inventors: Julien Mailfert, Nancy (FR); Nicolas Morand, Vosges (FR); Calogero Beltrami, Nancy (FR)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 13/674,516

(22) Filed: Nov. 12, 2012

(65) Prior Publication Data

US 2014/0134015 A1     May 15, 2014

(51) Int. Cl.
   *F04D 13/04*     (2006.01)
   *F01D 17/16*     (2006.01)
   *F02C 6/12*     (2006.01)

(52) U.S. Cl.
   CPC .............. *F01D 17/16* (2013.01); *F01D 17/165* (2013.01); *F02C 6/12* (2013.01)
   USPC .............. 417/380; 417/407; 415/164; 60/602

(58) Field of Classification Search
   USPC .............. 60/602; 415/163, 164; 417/380, 407
   See application file for complete search history.

(56) References Cited

U.S. PATENT DOCUMENTS

| | | | | |
|---|---|---|---|---|
| 4,499,732 | A * | 2/1985 | Szczupak et al. | 60/602 |
| 6,679,057 | B2 * | 1/2004 | Arnold | 60/602 |
| 7,351,042 | B2 * | 4/2008 | Jinnai et al. | 417/407 |
| 7,509,804 | B2 * | 3/2009 | Kobayashi | 60/602 |
| 7,946,116 | B2 * | 5/2011 | Sausse et al. | 60/602 |
| 8,250,868 | B2 * | 8/2012 | Hamada | 60/615 |
| 8,545,172 | B2 * | 10/2013 | Severin et al. | 415/164 |
| 2006/0179838 | A1 * | 8/2006 | Nakagawa et al. | 60/600 |
| 2011/0138805 | A1 * | 6/2011 | Barthelet et al. | 60/602 |
| 2011/0167817 | A1 * | 7/2011 | Sausse et al. | 60/602 |
| 2011/0314808 | A1 * | 12/2011 | Mohamed et al. | 60/602 |
| 2013/0078082 | A1 * | 3/2013 | Arnold et al. | 415/159 |
| 2013/0078083 | A1 * | 3/2013 | Barthelet et al. | 415/167 |

\* cited by examiner

*Primary Examiner* — Bryan Lettman
(74) *Attorney, Agent, or Firm* — John C. James

(57) ABSTRACT

A variable-vane assembly for a turbocharger includes an annular nozzle ring supporting an array of rotatable vanes, an insert having a tubular portion sealingly received into the bore of the turbine housing and having a nozzle portion extending radially out from one end of the tubular portion and being axially spaced from the nozzle ring with the vanes therebetween, and an annular retainer ring disposed radially outward of the nozzle ring and extending generally radially inwardly. The nozzle ring's face is stepped, and a radially inner edge of the retainer ring engages the face of the nozzle ring radially outward of the step, the radially inner edge of the retainer ring having an axial thickness that is less than the step height such that a remaining portion of the step is presented to the exhaust gas flowing through the nozzle.

8 Claims, 4 Drawing Sheets

TURBOCHARGER AND VARIABLE-NOZZLE CARTRIDGE THEREFOR

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

Clearances between the ends of the vanes and the adjacent nozzle walls generally have a deleterious effect on turbine efficiency and hence overall turbocharger performance. This clearance effect is particularly harmful at low engine speeds.

BRIEF SUMMARY OF THE INVENTION

The present invention is based on a discovery that the performance penalty due to vane clearance at low engine speeds can be substantially reduced by arranging a "negative" step in the nozzle flow path radially outwardly of the vanes. By "negative" step, it is meant that the step is facing radially outwardly so as to be impinged by exhaust gas flowing radially inwardly through the nozzle. It has been found that such a negative step has a performance benefit similar to that achieved by reducing the vane clearance in the absence of such a step, but without incurring the problems that can arise when the vane clearance is reduced (e.g., vane binding because of thermal expansion/contraction effects).

In one embodiment described herein, a variable-vane assembly for a turbocharger comprises a generally annular nozzle ring having opposite first and second faces, the first face forming one wall of the nozzle for the turbine, and an insert having a tubular portion sealingly received into a bore of the turbine housing and having a nozzle portion extending generally radially out from one end of the tubular portion, the nozzle portion being axially spaced from the nozzle ring and forming an opposite wall of the nozzle. The first face of the nozzle ring defines a radially outwardly facing step of axial height h at a radially outer perimeter of the nozzle ring.

An array of vanes is circumferentially spaced about the nozzle ring and disposed radially inwardly of the step. Exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel.

The assembly further includes a generally annular retainer ring disposed radially outward of the nozzle ring and extending generally radially inwardly, a radially inner edge of the retainer ring engaging the first face of the nozzle ring radially outward of the step. The radially inner edge of the retainer ring has an axial thickness t that is less than h such that a remaining portion of the radially outwardly facing step (having an axial height equal to h minus t) is presented to the exhaust gas flowing through the nozzle.

The retainer ring can be either a separately formed part from the turbine housing, or an integral portion of the turbine housing. In the case of a separately formed retainer ring, the retainer ring can be secured relative to the center housing, for example by clamping a radially outer portion of the retainer ring between the turbine housing and center housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
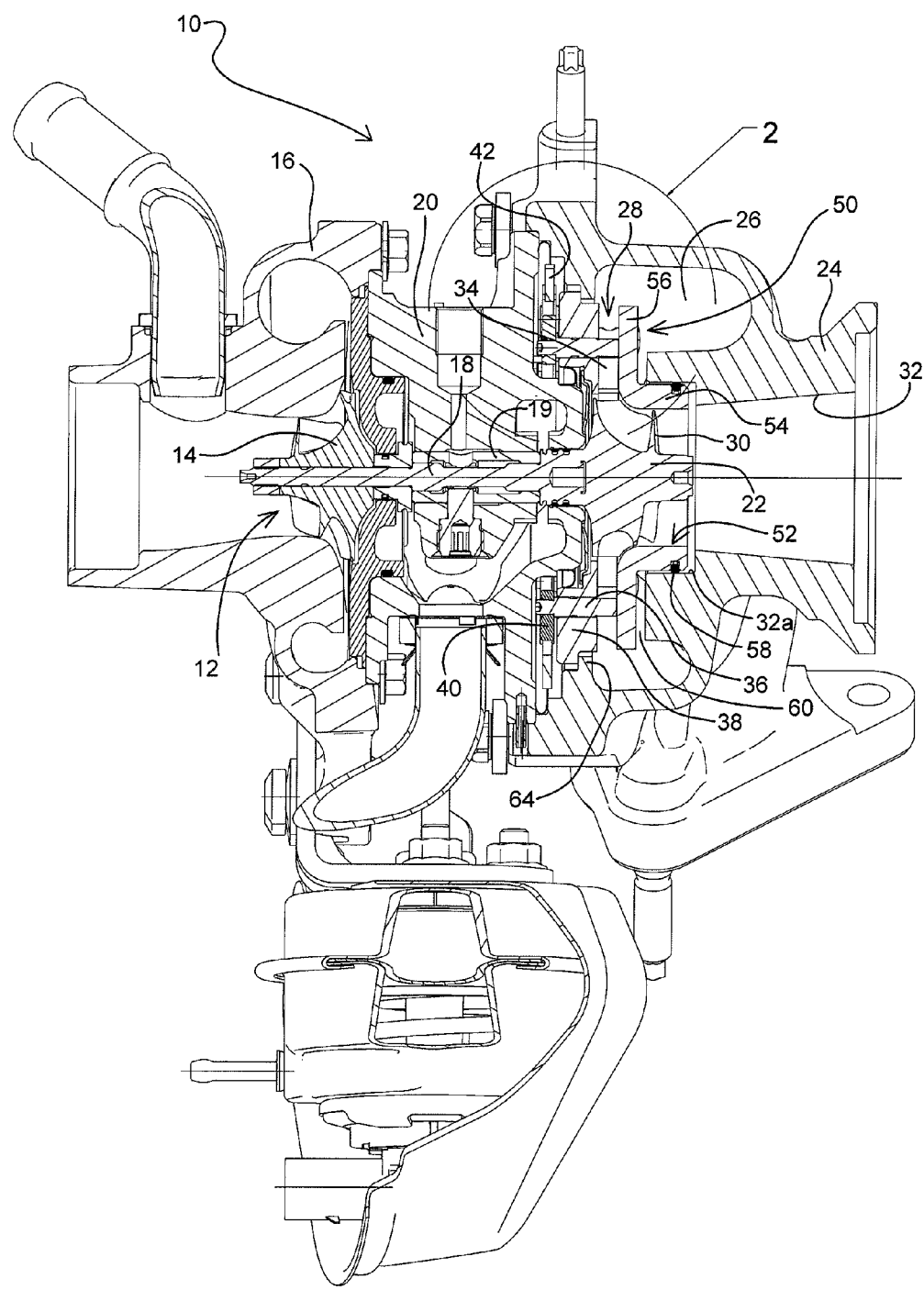
FIG. 1 is a cross-sectional view of a turbocharger in accordance with an embodiment of the invention.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to a pin 36 that passes through an aperture in a generally annular nozzle ring 38 that is mounted coaxially with respect to the turbine wheel 22. Each pin 36 is rotatable about its axis for rotating the attached vane. The nozzle ring 38 forms one wall of the flow passage of the nozzle 28. Each of the pins 36 has a vane arm 40 affixed to an end of the pin that protrudes out from the nozzle ring 38, and is enagaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to vary the cross-sectional flow area through the nozzle 28.

The variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into a portion 32*a* of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. A plurality of spacers are connected between the nozzle portion 56 of the insert 52 and the nozzle ring 38 for securing the nozzle ring to the insert and maintaining the desired axial spacing between the nozzle portion of the insert and the nozzle ring.

The bore portion 32*a* of the turbine housing has a radius that exceeds that of the remainder of the bore 32 by an amount slightly greater than the radial thickness of the tubular portion 54 of the insert 52. The radially outer surface of the tubular portion 54 has at least one circumferential groove, and preferably has two axially spaced grooves as shown in FIG. 1, in each of which a sealing ring 58 is retained for sealingly engaging the inner surface of the bore portion 32*a*. Advantageously, the outer diameter of the tubular portion 54 of the insert is slightly less than the inner diameter of the bore portion 32*a* so that a slight gap is defined therebetween, and only the sealing rings 58 make contact with the inner surface of the bore portion 32*a*. Additionally, there is a gap 60 between the nozzle portion 58 and the adjacent end of the turbine housing at the end of the bore portion 32*a*. In this manner, the insert 52 is mechanically and thermally decoupled from the turbine housing 24.

Figure 2:
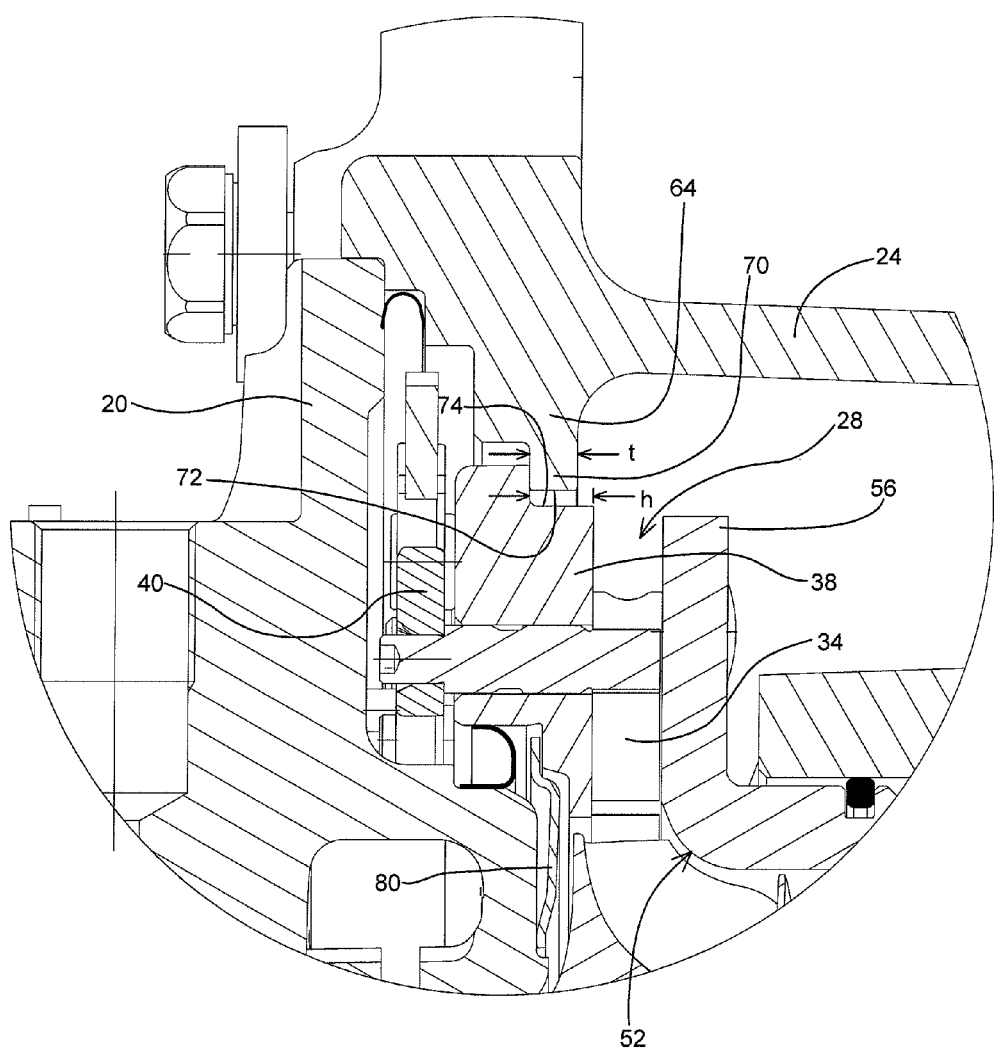
FIG. 2 is a magnified portion of the cross-sectional view of FIG. 1.

The turbine housing 24 defines an integral, generally annular retainer ring 64 that is now described with more particular reference to FIG. 2. At its radially inner side, the retainer ring has an annular radially inwardly extending projection 70 that engages the surface of the nozzle ring 38 facing toward the insert 52. The engagement between the projection 70 and the nozzle ring 38 preferably is along a full 360° circumference of the nozzle ring so as to substantially seal the interface between the retainer ring and the nozzle ring. The projection 70 also assists in restraining the nozzle ring with respect to axial movement in the direction toward the insert 52. Advantageously, the retainer ring 64 has a radially inner surface 72 facing toward a radially outer surface 74 of the nozzle ring 38, and the retainer ring surface 72 is slightly greater in diameter than the nozzle ring surface 74 such that there is a gap between these surfaces. This gap accommodates radial displacement of the nozzle ring relative to the retainer ring, such as may occur through differential thermal growth or other causes.

The cartridge 50 further comprises a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the shroud firmly against surfaces of the nozzle ring and center housing to substantially seal against these surfaces.

In accordance with the invention, the face of the nozzle ring 38 that faces toward the nozzle portion 56 of the insert 52 defines a radially outwardly facing step of axial height h at a radially outer perimeter of the nozzle ring. The integral retainer ring's projection 70 has a thickness t that is smaller than h by a predetermined amount. Because the projection 70 abuts the axially facing surface of the nozzle ring created by the step, a remaining portion of the radially outwardly facing (or "negative") step is presented to the exhaust gas flowing through the nozzle 28. The height of this negative step is h−t. Testing conducted on turbines having negative steps ranging in height from zero to 1 mm has demonstrated that the performance penalty associated with vane clearance at low engine speeds can be substantially reduced by providing the negative. It has been found that such a negative step has a performance benefit similar to that achieved by reducing the vane clearance in the absence of such a step, but without incurring the problems that can arise when the vane clearance is reduced (e.g., vane binding because of thermal expansion/contraction effects).

Figure 3:
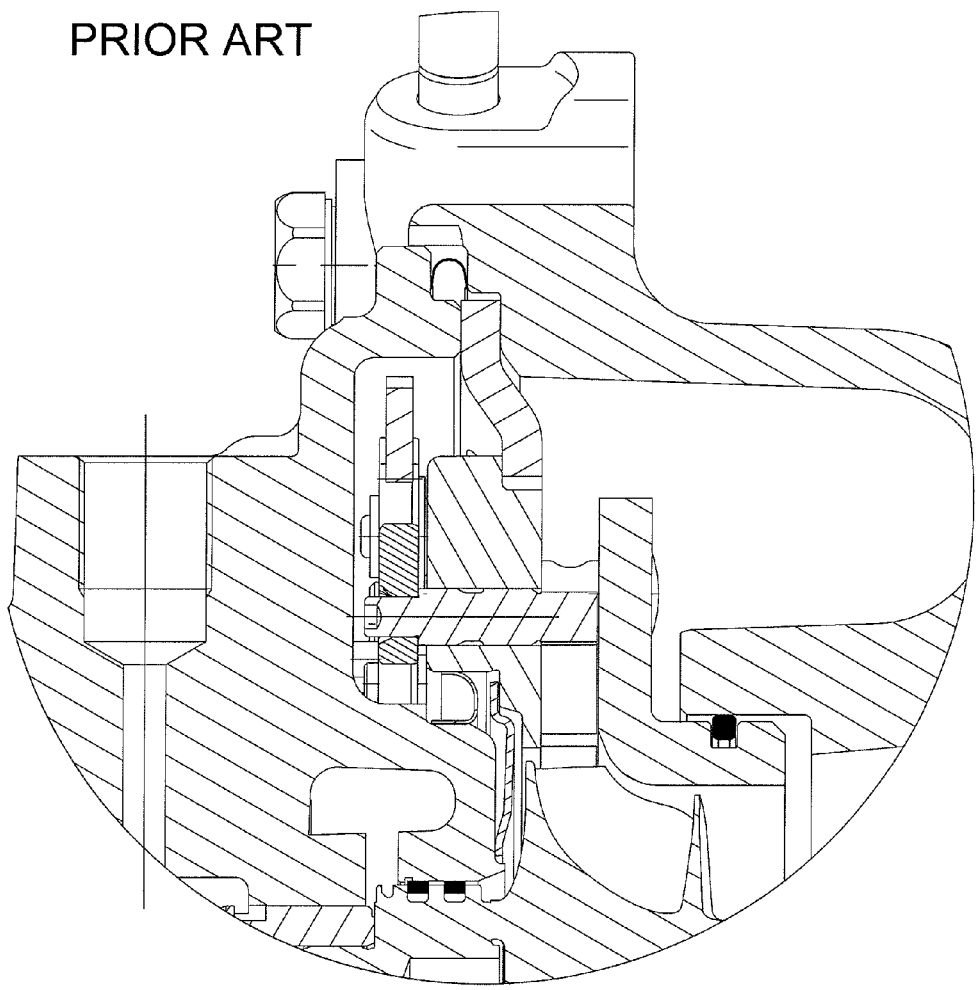
FIG. 3 is a view similar to FIG. 2 but showing a prior-art arrangement.

In particular, four turbocharger configurations were tested, generally conforming to FIG. 1 except for the variations noted below. Configuration #1 had a non-integral retainer ring having a thickness equal to the nozzle ring step such that there was zero step presented to the gas flow, as depicted in FIG. 3. Configuration #1 also had an average vane clearance of 119 μm.

Configuration #2 was the same as Configuration #1 except the average vane clearance was 103 μm.

Figure 4:
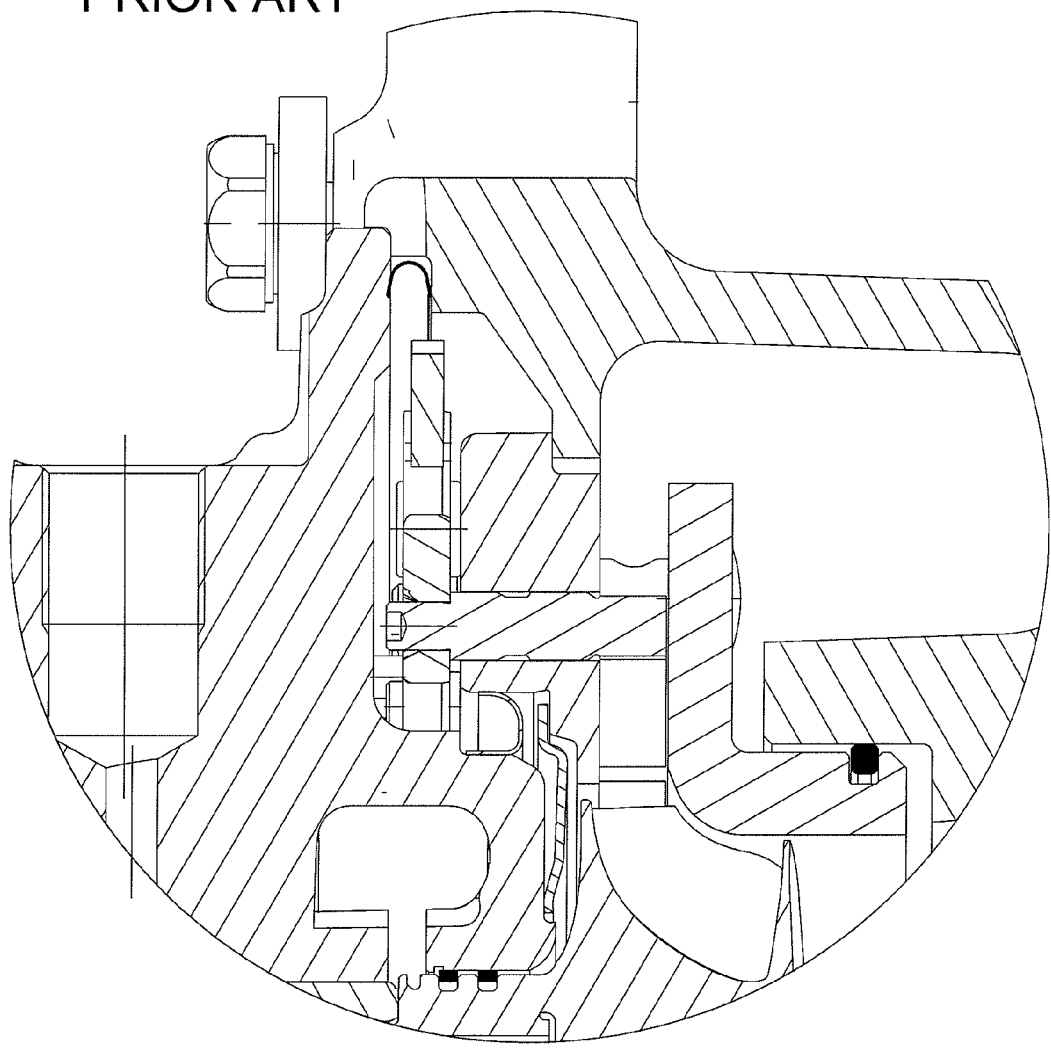
FIG. 4 is a view similar to FIG. 3, showing a further prior-art arrangement.

Configuration #3 had an integral retainer ring having a thickness equal to the nozzle ring step such that there was zero step presented to the gas flow, as depicted in FIG. 4. Configuration #3 also had an average vane clearance of 122 μm.

Configuration #4 had an integral retainer ring having a thickness 1 mm less than the nozzle ring step such that there was a negative step of 1 mm height presented to the gas flow, as depicted in FIG. 2. Configuration #4 also had an average vane clearance of 122 μm.

Thus, Configurations #1-3 do not embody the present invention, and Configuration #4 does embody the present invention. It would normally be expected that Configurations #1, #3, and #4 would all be poorer in performance than Configuration #2 because these configurations have significantly larger vane clearance than #2. Surprisingly, however, engine testing at full load showed that the measured brake torque at low engine speed (1250 rpm, the speed at which there was the largest spread between the four configurations) was the highest for Configurations #2 and #4, with virtually no difference between them. Brake torque for Configuration #3 (integral retainer, no step, high vane clearance) was the next highest, and brake torque for Configuration #1 (non-integral retainer, no step, high vane clearance) was the lowest, as shown in the Table below:

TABLE

| Measured Brake Torque, Q, at 1250 rpm engine speed | | | |
|---|---|---|---|
| Invention: Configuration #4 Integral retainer, 1 mm step, 122 μm vane clearance | Comparison: Configuration #1 Non-integral retainer, no step, 119 μm vane clearance | Comparison: Configuration #2 Non-integral retainer, no step, 103 μm vane clearance | Comparison: Configuration #3 Integral retainer, no step, 122 μm vane clearance |
| Q = 168 Nm % Δ = 0 | Q = 148 Nm % Δ = −11.9% | Q = 170 Nm % Δ = +1.2% | Q = 159 Nm % Δ = −5.4% |

Configurations #3 and #4 differed only in the absence or presence of the 1 mm negative step. Comparison of the results for these configurations indicates that the negative step had a performance benefit of about 5%. Comparison of Configurations #1 and #2 (differing only in the vane clearance) indicates that reducing vane clearance by 16 μm had a performance benefit of about 13% with no step. Using the negative step concept of the invention, it is possible to achieve essentially the same level of performance as that achieved with reduced vane clearance, while avoiding the binding problems that can come with small vane clearance.

The nozzle ring step height h can vary, as can the retainer thickness t. As non-limiting examples, the height h can range from about 3 mm to about 5 mm, and the thickness t can range from about 2 mm to about 4 mm, such that the negative step height ranges from about 1 mm to about 2 mm.

FIG. 2 shows an integral retainer 64, but the invention is not limited to such integral retainers. Alternatively, the retainer can be non-integral, of the type shown in FIG. 3 but configured such that a negative step is formed as in FIG. 2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
 a turbine assembly comprising a turbine housing and a turbine wheel mounted in the turbine housing and connected to a rotatable shaft for rotation therewith, the turbine housing defining a chamber surrounding the turbine wheel for receiving exhaust gas from an engine and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;
 a compressor assembly comprising a compressor housing and a compressor wheel mounted in the compressor housing and connected to the rotatable shaft for rotation therewith;
 a center housing connected between the compressor housing and the turbine housing; and
 a variable-vane assembly connected between the center housing and the turbine housing, the variable-vane assembly comprising:
  a generally annular nozzle ring having opposite first and second faces, the first face forming one wall of the nozzle, and an insert having a tubular portion sealingly received into the bore of the turbine housing and having a nozzle portion extending generally radially out from one end of the tubular portion, the nozzle portion being axially spaced from the nozzle ring and forming an opposite wall of the nozzle, the first face of the nozzle ring defining a radially outwardly facing step of axial height h at a radially outer perimeter of the nozzle ring;
  an array of vanes circumferentially spaced about the nozzle ring and disposed radially inwardly of the step, exhaust gas flowing between the vanes to the turbine wheel, each vane being rotatably mounted to the nozzle ring and connected to a rotatable actuator ring such that rotation of the actuator ring rotates the vanes for regulating exhaust gas flow to the turbine wheel; and
  a generally annular retainer ring disposed radially outward of the nozzle ring and extending generally radially inwardly, a radially inner edge of the retainer ring engaging the first face of the nozzle ring radially outward of the step, the radially inner edge of the retainer ring having an axial thickness t that is less than h such that a remaining portion of the radially outwardly facing step is presented to the exhaust gas flowing through the nozzle.

2. The turbocharger of claim 1, wherein the retainer ring is a separately formed part from the turbine housing.

3. The turbocharger of claim 1, wherein the retainer ring is an integral portion of the turbine housing.

4. The turbocharger of claim 1, wherein the height h is about 3 to 5 mm and the axial thickness t is about 2 to 4 mm, such that the remaining portion of the step presented to the gas flow is about 1 to 2 mm in height.

5. A turbine and variable-vane assembly for a turbocharger, comprising:
 a turbine assembly comprising a turbine housing and a turbine wheel mounted in the turbine housing and connected to a rotatable shaft for rotation therewith, the turbine housing defining a chamber surrounding the turbine wheel for receiving exhaust gas from an engine and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;

a generally annular nozzle ring having opposite first and second faces, the first face forming one wall of the nozzle, and an insert having a tubular portion sealingly received into the bore of the turbine housing and having a nozzle portion extending generally radially out from one end of the tubular portion, the nozzle portion being axially spaced from the nozzle ring and forming an opposite wall of the nozzle, the first face of the nozzle ring defining a radially outwardly facing step of axial height h at a radially outer perimeter of the nozzle ring;

an array of vanes circumferentially spaced about the nozzle ring and disposed radially inwardly of the step, exhaust gas flowing between the vanes to the turbine wheel, each vane being rotatably mounted to the nozzle ring and connected to a rotatable actuator ring such that rotation of the actuator ring rotates the vanes for regulating exhaust gas flow to the turbine wheel; and a generally annular retainer ring disposed radially outward of the nozzle ring and extending generally radially inwardly, a radially inner edge of the retainer ring engaging the first face of the nozzle ring radially outward of the step, the radially inner edge of the retainer ring having an axial thickness t that is less than h such that a remaining portion of the radially outwardly facing step is presented to the exhaust gas flowing through the nozzle.

6. The turbine and variable-vane assembly of claim 5, wherein the retainer ring is a separately formed part from the turbine housing.

7. The turbine and variable-vane assembly of claim 5, wherein the retainer ring is an integral portion of the turbine housing.

8. The turbine and variable-vane assembly of claim 5, wherein the height h is about 3 to 5 mm and the axial thickness t is about 2 to 4 mm, such that the remaining portion of the step presented to the gas flow is about 1 to 2 mm in height.

* * * * *